Patented Oct. 21, 1941

2,260,258

UNITED STATES PATENT OFFICE 2,260,258

PRODUCTION OF NITROHYDROCARBONS

Jerome Martin, Terre Haute, Ind., assignor to Commercial Solvents Corporation, Terre Haute, Ind., a corporation of Maryland No Drawing. Application April 24, 1939, Serial No. 269,792

7 Claims. (Cl. 260—644)

My invention relates to the production of nitrohydrocarbons. More specifically, my invention relates to an improvement in the production of nitrohydrocarbons by the direct vapor phase nitration of hydrocarbons.

The vapor phase nitration of saturated hydrocarbons is described in U. S. Patent 1,967,667 of H. B. Hass et al., U. S. Patent 2,071,122 of H. B. Hass et al., and in copending application Serial No. 98,634 of H. B. Hass et al. According to this process, saturated hydrocarbons and nitric acid vapor or nitrogen dioxide are contacted in a reaction vessel maintained at a sufficiently high temperature to insure vapor phase conditions at the pressures employed.

Although the vapor phase nitration process gives satisfactory initial yields and conversions, it has been found that there is a tendency for these yields and conversions to drop off under continued operation. This effect appears to be similar to the deterioration or poisoning of a catalyst in a catalytic reaction, but as there is no catalyst employed in the process, the explanation of the phenomenon is not clear. It appears that after a certain period of operation, the interior walls of the reaction vessel acquire reaction-inhibiting characteristics. The reaction vessel in this condition is described as "deactivated," and it has been found that the deactivated reaction vessel can again be "reactivated" by treatment with various reactivating agents, as described in co-pending application Serial No. 272,152 of E. B. Hodge et al. Although the reactivating treatment is generally successful in increasing the yields and conversions after the reaction vessel has become deactivated, it is not always possible to completely reactivate, i. e., to obtain again the initial maximum yields and conversions. Furthermore, the reactivation treatment is undesirable in continuous commercial operation, since it involves stopping the process, effecting the reactivation treatment, and again starting up the process.

I have now discovered that the materials which have previously been found to be effective in remedying the deactivated condition of a reaction vessel may also be satisfactorily employed as preventive agents to preclude the initial occurrence of deactivation. In accordance with my present invention, the reaction vessel is treated with the reactivating agent during the operation of the nitration process, and before any deactivation takes place. This treatment is continued during the operation of the nitration process, and is preferably effected in a continuous manner, although intermittent treatment will be satisfactory if effected at sufficiently short intervals. By means of this preventive treatment, it is possible to operate the process continuously, with little or no deactivation of the vessel taking place. In fact, I have been able to secure continuous operation over a period of many months, with no apparent deactivation whatever, i. e., no apparent decrease from the initial maximum yields and conversions.

In carrying out the preventive treatment of my present invention, it is merely necessary to introduce intermittently or continuously into the reaction vessel one of the known reactivating agents. It is desirable that the material be introduced in such a manner that it can contact the entire inner surface of the vessel, and for this reason I prefer to disperse the treating agent in a finely-divided form in the reactant vapors entering the vessel. Thus, a finely-divided solid may be suspended in the entering gas stream, or a molten material, or a solution or suspension, may be atomized into the entering gas stream.

When employing nitric acid rather than nitrogen dioxide as the nitrating agent, a very convenient method for carrying out my present invention consists in vaporizing the nitric acid by contacting the liquid acid with a molten salt bath, at least one of the components of which constitutes a reactivating agent. In this method of operation, the contact of the cold acid with the molten salt bath gives rise to pronounced turbulence, with resulting entrainment of salt particles in the vapor stream leaving the vaporizing vessel. In the absence of undue baffle effects, the entrained particles are carried into the reaction vessel and contact the inner surfaces thereof to effect the desired preventive treatment. It will be evident, of course, that various other mechanical equivalents for introducing finely-divided reactivating agents may be employed, and it is to be understood that my invention is not limited to the mechanical details of this operation.

My process for continuously treating the reaction vessel may be used in conjunction with any of the known methods for carrying out the vapor phase nitration process. Any combination of reactants and reaction conditions known to be operative for vapor phase nitration may be employed in conjunction with the present preventive treatment. The known nitrating agents, such as nitric acid vapor or nitrogen dioxide, may be utilized, and any of the various hydrocarbons may be nitrated. My improved process is particularly effective in the nitration of the saturated hydrocarbons, such as methane, ethane, propane, butanes, pentanes, hexanes, cyclohexane, and the like, utilizing nitric acid vapor as the nitration agent.

Known reactivating agents are available for the treatment of deactivated vessels at reactivating temperatures throughout the entire operative range for the nitration reaction, and I have found that such agents are effective at the same temperatures for preventing deactivation when employed in the present procedure. It is probable that materials requiring relatively high temperature for effecting reactivation will be effective to prevent deactivation at lower temperatures; but it is unnecessary to attempt such applications since there are a great many materials readily available which are active at even the lowest temperatures employed in the nitration process. In general, temperatures of 250° C. to 800° C., or even higher, may be employed for the nitration reaction, depending upon the space velocity. The preventive treatment of my present invention is effective throughout this entire range, but I prefer to operate within the range 350° C. to 500° C., to secure optimum yields and conversions.

The remaining operating conditions for the reaction, such as pressure and space velocity, may be chosen in accordance with prior practices, the limiting values, of course, being dependent upon the temperature employed, and the particular reactants. These conditions, however, have no direct bearing upon the preventive treatment of the present invention, and may be varied widely in accordance with known procedures for this type of reaction.

Any suitable type of apparatus for vapor phase reactions of this general nature may be utilized when carrying out my present procedure. Reaction vessels of different materials of construction differ in their deactivating tendencies, copper, aluminum, iron, and the ferrous alloys apparently being the most easily deactivated. Stainless steel is particularly suited for the construction of apparatus of this type, and my process adequately inhibits deactivation of this material. The particular structure of the apparatus is not critical, but it is desirable that the nitration reaction vessel be of such form and be so positioned that the treating agent can readily contact the entire inner surface thereof.

It will also be obvious that certain precautions should be taken to prevent the solid treating material from blocking the flow of the reactants through the reaction vessel, or through the auxiliary apparatus. Likewise, when employing the reactivating agent in the salt bath for vaporizing nitric acid for the process, precautions must be taken to prevent the entrained reactivating salt from separating completely from the vapor stream, prior to entering the reaction vessel. Such obvious precautions, and various equivalent means for effecting the present process, will be obvious to those skilled in the art, and my invention is not to be construed as limited to any mechanical details for this purpose.

Any of the known reactivating agents, such as those described in co-pending application, Serial No. 272,152, referred to above, may be employed as the agents for preventing deactivation in accordance with the present invention. Reactivating agents, chosen from the class consisting of the alkali and alkaline earth metal compounds are particularly suited for use in the present invention, and among these I prefer to employ the alkali metal compounds. In general, it is desirable to utilize a reactivating agent which is molten under the conditions employed in the nitration reaction, in order to insure adequate contact of the treating agent with the entire inner surface of the vessel; and for this reason, as well as for greater activity, certain of the alkali metal compounds are to be preferred.

For use in the molten salt bath for vaporizing nitric acid for the process, the reactivating agent should preferably constitute a nitric acid salt which is stable in the presence of nitric acid at the temperature of the salt bath. The alkali metal nitrates and mixtures of these nitrates with other nitric acid salts are particularly satisfactory for use as the vaporizing salt bath. A large number of salt mixtures are available for this purpose, so that a salt bath of suitable melting point may readily be chosen, depending upon the desired operating pressure (which, of course, controls the boiling point of the nitric acid). In general, it is preferable to employ a salt mixture which is stable in the molten state at 60° to 100° C., above the boiling point of nitric acid at the operating pressure, and to operate at such temperature in order to insure adequate heat transfer. Since most of the nitric acid salts melt at relatively high temperatures, it is convenient to employ mixtures having minimum melting points, or eutectic points. The following is a representative list of suitable salt mixtures for this purpose:

| Composition | Minimum melting point | Maximum melting point |
|---|---|---|
| | °C. | °C. |
| Lithium nitrate<br>Sodium nitrate<br>Potassium nitrate | 120 | 334 |
| Potassium nitrate<br>Silver nitrate | 131 | 334 |
| Rubidium nitrate<br>Silver nitrate | 136 | 310 |
| Sodium nitrate<br>Thallium nitrate | 162 | 308 |
| Lithium nitrate<br>Silver nitrate | 172 | 255 |
| Sodium nitrate<br>Potassium nitrate<br>Calcium nitrate | 175 | 561 |
| Potassium nitrate<br>Thallium nitrate | 182 | 334 |
| Sodium nitrate<br>Potassium nitrate<br>Lead nitrate | 186 | 357 |
| Potassium nitrate<br>Lead nitrate | 207 | 357 |
| Sodium nitrate<br>Potassium nitrate<br>Strontium nitrate | 210 | 570 |
| Potassium nitrate<br>Calcium nitrate | 210 | 561 |
| Sodium nitrate<br>Potassium nitrate<br>Barium nitrate | 214 | 592 |
| Sodium nitrate<br>Calcium nitrate | 237 | 561 |
| Potassium nitrate<br>Barium nitrate<br>Strontium nitrate | 260 | 592 |
| Sodium nitrate<br>Lead nitrate | 268 | 357 |
| Sodium nitrate<br>Barium nitrate<br>Lead nitrate | 269 | 592 |
| Potassium nitrate<br>Strontium nitrate | 275 | 570 |
| Sodium nitrate<br>Strontium nitrate | 295 | 570 |
| Lithium nitrate<br>Potassium nitrate<br>Barium nitrate | 300 | 592 |
| Potassium nitrate<br>Barium nitrate | 312 | 592 |
| Sodium nitrate<br>Barium nitrate | 358 | 592 |

If the reactivating agent is to be introduced directly into the reaction vessel or into the entering gas stream, instead of being employed in the nitric acid vaporizer, the nitric acid salts still constitute the preferred materials, but the reactivating agents may also be satisfactorily employed in the form of other active compounds, either inorganic or organic. In view of the presence of nitric acid in the reaction chamber, any of the compounds employed will be at least partially transformed into the corresponding nitric acid salt during the course of the nitration reaction. For this reason it is desirable to utilize the nitric acid salts initially, or to employ compounds such as the hydroxides or carbonates, which will not form by-products difficult to separate from the reaction products. Various other compounds, such as sulfates, phosphates, chromates, halides, and the like, which are known to be reactivating agents, will serve satisfactorily as preventive agents in the present invention, but are less desirable than the nitrates, hydroxides, or carbonates, in view of the nature of the reaction products obtained in the partial transformation of these compounds into the corresponding nitrates.

It is desirable, although not essential, that the reactivating agents for introduction directly into the reaction vessel, or into the entering gas stream, be molten at the reaction temperature. Many of the individual compounds, such as the alkali metal hydroxides and nitrates, have melting points within the desired operating temperature range. However, numerous other compounds which are active reactivating agents, have much higher melting points, and it is therefore convenient to employ mixtures having minimum melting points, or eutectic points. The following is a representative list of such mixtures:

| Composition | Minimum melting point |
|---|---|
| | °C. |
| Sodium hydroxide<br>Potassium hydroxide | 184 |
| Sodium hydroxide<br>Rubidium hydroxide | 241 |
| Potassium hydroxide<br>Rubidium hydroxide | 306 |
| Potassium sulfate<br>Potassium nitrate | 333 |
| Sodium borate | 475 |
| Calcium phosphate<br>Lithium carbonate | 492 |
| Potassium carbonate<br>Lithium sulfate | 551 |
| Cadmium sulfate<br>Lithium sulfate | 596 |
| Sodium sulfate<br>Sodium tungstate | 630 |
| Potassium tungstate<br>Potassium sulfate | 680 |
| Manganese sulfate<br>Potassium carbonate<br>Calcium carbonate | 753 |

The amount of reactivating agent which it is necessary to use for prevention of deactivation of the reaction vessel, will of course depend to some extent upon the nature of the agent used, and the means employed for effecting contact of the agent with the interior walls of the vessel. Thus, a reactivating agent which is molten at the reaction temperature may generally be employed in smaller amounts than a material which is solid at such temperature. Similarly, smaller amounts of the reactivating agent will be required if the apparatus is suitably designed to afford ease of contact of the material with the entire inner surface of the reaction vessel. In any case, however, the amount required is extremely small compared to the quantities of reactants simultaneously used in the process. In general, it may be said that less than 0.1% of reactivating agent, based on the weight of the nitric acid employed, will be sufficient to completely prevent deactivation of the reaction vessel. Much larger amounts of the reactivating agent may, of course, be employed, and it is usually desirable to provide a factor of safety in this respect. A large excess will not adversely affect the reaction, and will merely involve mechanical and economic considerations. The optimum or minimum amounts to effect this end in any particular case can, of course, readily be determined by preliminary experiment.

My invention may be illustrated by the following specific example:

Nitric acid (13.5 N.) was vaporized by dropping the liquid acid onto the surface of a molten salt bath comprising approximately equal parts by weight of sodium and potassium nitrates. The salt bath was maintained at approximately 230° C., and the acid was vaporized at a rate of approximately 9 kilograms per hour. The resulting nitric acid vapor, together with the small amount of entrained sodium and potassium nitrates, was mixed with propane gas and immediately introduced into a stainless iron reaction vessel of 0.84 liter capacity, maintained at 430–445° C. The propane feed rate was approximately 10 kiloliters per hour (760 mm. Hg; 25° C.). The initial yield of nitrohydrocarbons obtained was approximately 2.8 liters per hour, and this yield was maintained in continuous operation for 60 days. At the end of this period of operation, there was no apparent decrease in the quantity of molten salt in the vaporizing bath, but a very small amount of salt was collected at the exit of the reaction vessel during the operation. In a similar experiment in which the nitric acid was vaporized by admixture with superheated propane, and no reactivating agent was employed as a preventive of deactivation, the yield fell to 1.5 liters per hour after 5 days of operation.

It is to be understood, of course, that the above example is illustrative only, and does not limit the scope of my invention. Likewise, the various reactivating agents and mixtures containing such agents, listed above, are not to be construed as limiting the scope of my invention. Any of the various agents which are active to reactivate a deactivated vessel, are operative for preventing deactivation in accordance with the present procedure. Similarly, any of the various methods for effecting the nitration reaction may suitably be employed in conjunction with the present procedure. In general it may be said that any equivalents or modifications, which would naturally occur to those skilled in the art, are included within the scope of my invention.

My invention now having been described, what I claim is:

1. In a process for the vapor phase nitration of hydrocarbons, the improvement which comprises introducing a reactivating agent, effective in decreasing the reaction-inhibiting characteristics of the deactivated nitration reaction vessel walls, into said nitration reaction vessel during the course of the nitration reaction.

2. In a process for the vapor phase nitration of hydrocarbons, the improvement which comprises introducing into the reaction vessel, during the course of the reaction, a reactivating agent for nitration reaction vessels, selected from the group consisting of the substantially water-soluble salts of the alkaline earth metals, the salts of the alkali metals, and the bases of the alkali metals and the alkaline earth metals.

3. In a process for the vapor phase nitration of hydrocarbons, the improvement which comprises continuously introducing into the nitration reaction vessel, during the course of the reaction, a reactivating agent, effective in decreasing the reaction-inhibiting characteristics of the deactivated nitration reaction vessel walls, which is molten at the reaction temperature.

4. In a process for the vapor phase nitration of saturated hydrocarbons, the improvement which comprises continuously introducing into the stream of reactant gases entering the nitration reaction vessel, a finely-divided reactivating agent for nitration reaction vessels selected from the alkali metal compounds which are molten at the nitration reaction temperature.

5. In a process in which nitric acid is vaporized and the resulting vapors are reacted with saturated hydrocarbons in the vapor phase to form nitrohydrocarbons, the improvement which comprises vaporizing said nitric acid by contact with a molten salt bath containing a reactivating agent, effective in decreasing the reaction-inhibiting characteristics of the deactivated nitration reaction vessel walls, and introducing the resulting nitric acid vapors and entrained reactivating agent into said nitration reaction vessel.

6. In a process in which nitric acid is vaporized and the resulting vapors are reacted with saturated hydrocarbons in the vapor phase to form nitrohydrocarbons, the improvement which comprises vaporizing said nitric acid by contact with a molten salt bath containing a reactivating agent for nitration reaction vessels selected from the group consisting of the substantially water-soluble salts of the alkaline earth metals, the salts of the alkali metals, and the bases of the alkali metals and the alkaline earth metals, and introducing the resulting nitric acid vapors and entrained reactivating agent into the nitration reaction vessel.

7. In a process in which nitric acid is vaporized, and the resulting vapors are reacted with saturated hydrocarbons in the vapor phase to form nitrohydrocarbons, the improvement which comprises vaporizing said nitric acid by contact with a molten salt bath containing an alkali metal nitrate, and introducing the resulting nitric acid vapors and entrained alkali metal nitrate into the nitration reaction vessel.

JEROME MARTIN.